US 6,662,992 B2

(12) United States Patent
Betrabet et al.

(10) Patent No.: US 6,662,992 B2
(45) Date of Patent: Dec. 16, 2003

(54) METHOD AND APPARATUS FOR REDUCING ADHESIVE BUILD-UP ON ULTRASONIC BONDING SURFACES

(75) Inventors: Chinmay Suresh Betrabet, Corvallis, OR (US); Davis Hoang Nhan, Greenville, WI (US); Barton Andrew Laughlin, Hortonville, WI (US); Daniel Hoo, Appleton, WI (US); James Melvin Gaestel, Seymour, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/029,327

(22) Filed: Dec. 19, 2001

(65) Prior Publication Data

US 2002/0121292 A1 Sep. 5, 2002

Related U.S. Application Data

(60) Provisional application No. 60/258,852, filed on Dec. 28, 2000.

(51) Int. Cl.[7] .......................... B23K 1/06; B23K 20/10; B23K 5/20; B08B 3/00
(52) U.S. Cl. ..................... 228/1.1; 228/110.1; 228/111; 134/34
(58) Field of Search .............................. 228/110.1–111, 228/199, 201, 1.1; 134/34

(56) References Cited

U.S. PATENT DOCUMENTS

| 2,893,468 A | | 7/1959 | Fieroh |
| 4,285,758 A | | 8/1981 | Clausen et al. |
| 4,610,681 A | | 9/1986 | Strohbeen et al. |
| 4,641,381 A | | 2/1987 | Heran et al. |
| 4,692,202 A | | 9/1987 | Getz |
| 4,933,015 A | * | 6/1990 | White ........................... 134/6 |
| 5,096,532 A | | 3/1992 | Neuwirth et al. |
| 5,110,403 A | | 5/1992 | Ehlert |
| 5,119,840 A | * | 6/1992 | Shibata ....................... 134/184 |
| 5,390,013 A | | 2/1995 | Snelling |
| 5,879,500 A | | 3/1999 | Herrin et al. |

FOREIGN PATENT DOCUMENTS

| JP | 55-154119 | 1/1980 |
| WO | WO 99/25296 A1 | 5/1999 |

* cited by examiner

Primary Examiner—Tom Dunn
Assistant Examiner—Colleen P. Cooke
(74) Attorney, Agent, or Firm—Sebastian C. Puglies; Patricia A. Charlier (57) ABSTRACT

A method for reducing adhesive build-up on ultrasonic bonding surfaces of ultrasonic bonding systems is disclosed. The method includes providing an ultrasonic bonding surface. A pad is provided proximate to, and in fluid contact with, the ultrasonic bonding system. A fluid is conducted to the pad such that the fluid is applied is intermittently or continuously applied to at least a portion of the ultrasonic bonding surface.

17 Claims, 6 Drawing Sheets

METHOD AND APPARATUS FOR REDUCING ADHESIVE BUILD-UP ON ULTRASONIC BONDING SURFACES

This application claims the benefit of Provisional Application No. 60/258,852, filed Dec. 28, 2000.

FIELD OF THE INVENTION

This invention relates to a method and apparatus for reducing adhesive build-up on ultrasonic bonding surfaces through the application of a fluid to at least a portion of the ultrasonic bonding surfaces. More specifically, this invention relates to a method and apparatus for reducing adhesive build-up on ultrasonic bonding surfaces that alleviates heat build-up in the ultrasonic bonding equipment and reduces manufacturing downtime for cleaning and equipment repair and/or replacement.

BACKGROUND OF THE INVENTION

Absorbent articles, including diapers, training pants, adult incontinence products and feminine care pads, are generally manufactured by combining a liquid-permeable topsheet; a liquid-impermeable backsheet attached to the topsheet; and an absorbent core disposed between the topsheet and the backsheet. The topsheet, backsheet, absorbent core, and other components of the absorbent article or product may be coextensive or non-coextensive depending on the requirements of the product. Generally, each of the individual components is arranged so that it has intimate contact along at least a portion of its boundary with at least one other adjacent component of the absorbent article. Typically, each component is connected to an adjacent component of the absorbent article by a suitable bonding and/or fiber entanglement mechanism, such as ultrasonic or adhesive bonding, mechanical or hydraulic needling or other means generally known in the art. Often, both adhesive bonding and ultrasonic bonding are utilized in the manufacture of absorbent articles.

If adhesive is used to attach a portion of one component to a portion of another component to form a composite, the adhesive may be exposed to ultrasonic energy in subsequent processing steps. The ultrasonic energy may cause the adhesive to flow. This, in turn, may lead to build-up or accretion of the adhesive on the ultrasonic bonding horn and/or anvil if the adhesive penetrates through some or all of the composite, seeps between the separate layers of the composite, or both. Often this build-up, over time, results in uneven bonding and increased heat build-up on the ultrasonic bonding horn. Furthermore, the adhesive build-up often leads to horn failure and increased down time of the production machine for maintenance and/or cleaning.

Now, a method and apparatus for substantially reducing the amount of adhesive build-up or accretion on ultrasonic bonding surfaces has been developed. Intermittently or continuously applying a fluid to the ultrasonic bonding surfaces prevents or alleviates the build-up or accretion of adhesive on the surfaces by impeding adhesion of adhesive material to the ultrasonic bonding surface. By reducing the amount of adhesive build-up on the ultrasonic bonding surfaces bond integrity is maintained and downtime due to system failures and/or cleaning are reduced.

SUMMARY OF THE INVENTION

Briefly, this invention relates to a method and apparatus for reducing adhesive build-up on ultrasonic bonding surfaces during the operation of an ultrasonic bonding system. Accordingly, one version of this invention is directed to a method for reducing adhesive build-up on ultrasonic bonding surfaces comprising the steps of: providing an ultrasonic bonding surface; providing a pad proximate to, and in fluid contact with, the ultrasonic bonding surface; providing a fluid; and conducting the fluid to the pad so that the fluid is intermittently or continuously applied to at least a portion of the ultrasonic bonding surface. In some versions of the present invention the ultrasonic bonding surface is the ultrasonic bonding surface of an ultrasonic bonding horn. In other versions, the ultrasonic bonding surface is the ultrasonic bonding surface of an ultrasonic bonding anvil.

Another version of a method for reducing adhesive build-up on ultrasonic bonding surface comprises the steps of: providing an ultrasonic bonding surface; providing a pad having a width dimension equal to the width dimension of the ultrasonic bonding surface, proximate to, and in fluid contact with, the ultrasonic bonding surface; providing a fluid; and conducting the fluid to the pad so that the fluid is intermittently or continuously applied to at least a portion of the ultrasonic bonding surface.

In another aspect, a method for reducing adhesive build-up on ultrasonic bonding surfaces comprises the steps of: providing an ultrasonic bonding surface; providing a pad in a position above, and proximate to, the ultrasonic bonding surface such that the lower surface of the pad is in fluid contact with the ultrasonic bonding surface; providing a fluid; and conducting the fluid to the pad so that the fluid is applied intermittently or continuously to at least a portion of the ultrasonic bonding surface.

In another aspect, a method for reducing adhesive build-up on ultrasonic bonding surfaces comprises the steps described in any of the proceeding three paragraphs with the additional step of providing a pad comprised of a sponge material.

For example, a method for reducing adhesive build-up on ultrasonic bonding surfaces having features of the present invention includes the steps of: providing an ultrasonic bonding surface; providing a pad comprised of a cellulosic sponge material, polyurethane foam material, or natural sponge material proximate to, and in fluid contact with, the ultrasonic bonding surface; providing a fluid; and conducting the fluid to pad such that the fluid is intermittently or continuously applied to at least a portion of the ultrasonic bonding surface.

Another version of a method for reducing adhesive build-up on ultrasonic bonding surfaces of the present invention comprises the steps of: providing an ultrasonic bonding surface; providing a pad proximate to, and in fluid contact with, the ultrasonic bonding surface; providing a fluid; conducting the fluid to the pad in a quantity sufficient to place the pad in a substantially saturated condition; and conducting the fluid to the pad at a rate sufficient to maintain the pad in a saturated condition such that the fluid is continuously applied to at least a portion of the ultrasonic bonding surface.

In another version, a method for reducing adhesive build-up on ultrasonic bonding surfaces of the present invention comprises the steps of: providing an ultrasonic bonding surface; providing a pad on a roller proximate to, and in fluid contact with, the ultrasonic bonding surface; providing a fluid reservoir; providing a fluid; and conducting the fluid to the pad so that the fluid is continuously applied to at least a portion of the ultrasonic bonding surface. In some embodiments of the invention, the pad is provided in fluid contact with the ultrasonic bonding surface of an ultrasonic bonding horn and in others the pad is provided in fluid contact with ultrasonic bonding surface an ultrasonic bonding anvil.

In another aspect, a method for reducing adhesive build-up on ultrasonic bonding surfaces comprises the steps of: providing a ultrasonic bonding surface; providing pad on a roller proximate to, and in fluid contact with, the ultrasonic bonding surface; providing a fluid reservoir; providing a fluid; and conducting the fluid to the pad so that the fluid is continuously applied to substantially all of the ultrasonic bonding surface.

A further version of a method for reducing adhesive build-up on ultrasonic bonding surfaces of the present invention comprises the steps of: providing an ultrasonic bonding surface; providing a pad on a roller proximate to, and in fluid contact with the ultrasonic bonding surface; providing a fluid; providing a fluid reservoir at a height sufficient to allow the fluid to be conducted by gravity to the pad; and conducting the fluid to the pad so that the fluid is continuously applied to at least a portion of the ultrasonic bonding surface.

Another version of a method for reducing adhesive build-up on ultrasonic bonding surfaces of the present invention comprising the steps of: providing an ultrasonic bonding surface; providing a pad on a roller proximate to, and in fluid contact with the ultrasonic bonding surface; providing a fluid reservoir; providing a fluid; providing a pump to conduct fluid to the pad; and conducting the fluid from the reservoir to the pad so that the fluid is continuously applied to at least a portion of the ultrasonic bonding surface.

In another aspect, a method having the features of the present invention comprises the steps in any of the three preceding paragraphs, with the additional step of selecting a fluid wherein the fluid is water, propylene carbonate, isopropyl alcohol, mineral oil, 0.25 w/w % aqueous solution of an anionic surfactant, or any combination thereof.

For example, a method for reducing adhesive build-up on ultrasonic bonding surfaces of the present invention comprising the steps of: providing an ultrasonic bonding surface; providing a pad on a roller proximate to, and in fluid contact with, the ultrasonic bonding surface; providing a fluid reservoir; providing mineral oil; and conducting the mineral oil to the pad so that the mineral oil is continuously applied to at least a portion of the ultrasonic bonding surface.

Another version of a method for reducing adhesive build-up on ultrasonic bonding surfaces of the present invention comprises the steps of: providing an ultrasonic bonding surface; providing a hollow, cylindrical polyurethane open-cell foam pad having interior and exterior surfaces; providing a roller mount proximate to the ultrasonic bonding surface; providing the pad on the roller mount such that the exterior surface of the pad is in fluid contact with the ultrasonic bonding surface; providing a fluid reservoir; providing mineral oil; providing a pump; delivering the mineral oil to the interior surface of the pad at a rate of at least about 3 milliliters per minute; and conducting the mineral oil to the exterior surface of the pad so that the mineral oil is continuously applied to substantially all of the ultrasonic bonding surface. In some versions, the ultrasonic bonding surface is the ultrasonic bonding surface of an ultrasonic bonding anvil. In other versions, the ultrasonic bonding surface is the ultrasonic bonding surface of an ultrasonic bonding horn.

One version of an apparatus having features of the present invention comprises: an ultrasonic bonding anvil and an ultrasonic bonding horn, both the anvil and the horn each comprising an ultrasonic bonding surface; at least one application element (e.g. a pad, sponge, or other application element), proximate to and in fluid contact with the ultrasonic bonding surface of the anvil or the horn, the application element being capable of applying fluid to at least a portion of the ultrasonic bonding surface(s); a reservoir for containing the fluid, the reservoir having an outlet; a tube, pipe, or other conveyance element having one end attached to the outlet and the other end proximate to, or connected with, the application element such that the fluid conveyed from the reservoir via the conveyance element is discharged to the application element; and, optionally, a conduction element (e.g. a pump) interposed between the fluid reservoir and the application element capable of providing a motive force for moving the fluid from the reservoir, and via the conveyance element, to the application element. A conduction element may not be necessary when the force of gravity provides a sufficient motive force for moving the fluid from the reservoir to the application element. In some versions of the invention the volumetric flow rate or mass flow rate of the fluid may be controlled by pump speed or other variable associated with operating the pump. Alternatively, when the force of gravity provides a sufficient motive force for moving the fluid from the reservoir to the application element, a valve or other mechanical element may be used to regulate the volumetric flow rate or mass flow rate of the fluid from the reservoir to the application element.

These and other features, aspects, and advantages of the present invention will become better understood with regard to the following description, appended claims, and accompanying drawings.

DETAILED DESCRIPTION

The present invention is directed to a method for reducing build-up or accretion of adhesive, alone or in combination with other materials, on the surfaces of ultrasonic bonding equipment, e.g. equipment used to ultrasonically bond various components or pieces to one another. Thus, the invention encompasses methods for applying a fluid to an ultrasonic bonding surface, wherein the fluid is conducted to the ultrasonic bonding surface by a pad, thereby reducing build-up or accretion of adhesive on the ultrasonic bonding equipment.

Before describing various embodiments having features of the present invention, it is useful to define certain terms for purposes of the present application.

"Bonded" or "attached" refers to the joining, adhering, connecting, or the like, of two elements. Two elements are considered bonded together when they are bonded directly to one another or indirectly to one another (e.g., as when each element is directly bonded to an intermediate element).

"Piece" or "component" as used herein, means a discrete part, a web, or some other element used to help build a composite or an absorbent product. Examples of such discrete parts or webs are discussed below.

"Sponge" or "sponge material", as used herein, means a material containing open channels or pores which can absorb and/or conduct fluid through the material.

"Saturated" or "saturated condition", as used herein, means the element is filled to capacity, steeped with moisture or impregnated to a maximum degree with a fluid such that excess fluid is not present (e.g. fluid is not being conducted to surfaces other than the surface with which the element is in fluid contact).

The term "nonwoven" or "nonwoven web" refers to a web of material that is formed without the aid of a textile weaving or knitting process. The term "fabrics" is used to refer to all of the woven, knitted, and nonwoven fibrous webs.

A "liquid-permeable topsheet" generally comprises a nonwoven web; a spunbond, meltblown, or bonded-carded web composed of synthetic polymer filaments or fibers, such as polypropylene, polyethylene, polyesters or the like; a perforated film; or a web of natural polymer filaments or fibers such as rayon or cotton. In addition, the topsheet may be treated with a surfactant to aid in fluid transfer.

A "liquid-impermeable backsheet" generally comprises moisture-barrier materials such as films, wovens, nonwovens, laminates of films, or the like. For example, the backsheet may comprise a substantially liquid-impermeable web or sheet of plastic film such as polyethylene, polypropylene, polyvinyl chloride, or similar material.

"Gravity feed" or "gravity fed", as used herein, means that a fluid is allowed to flow from a higher level to a lower level without the aid of mechanical equipment.

The present invention is directed to a method for reducing adhesive build-up on ultrasonic bonding surfaces during the manufacture of laminates, composites and disposable products comprising both adhesive and ultrasonic bonds. A description of exemplary versions of laminates, composites, and/or absorbent articles serves to illustrate the present invention.

Thus, for example, a co-pending application corresponding to PCT International Publication Number WO 99/25296, published on May 27, 1999 and entitled "Disposable Underpants," and which is hereby incorporated by reference in a manner consistent with the present application, discloses a disposable underpant comprising elasticized leg and waist openings. The published application discloses the attaching of one or more elastic members, such as elastic strands, threads, or ribbons, to a substrate, web, or other piece to form a composite that functions as an elasticized waist opening. (See generally page 6, lines 6-34, of to PCT International Publication Number WO 99/25296.) In one embodiment, the published application discusses the sandwiching of elastic members between an outer cover and a body liner to form the composite. (Id. at page 18, line 30 through page 19, line 5.) Details regarding the nature of the elastic members, and how they may be attached to components or pieces such as an outer cover or body liner—as these terms are used in this PCT publication-are generally described from page 19, line 17, through page 21, line 6 of this referenced PCT publication. The publication discloses the use of an adhesive, typically applied in a meltblown or swirl pattern, to bond the elastic material (e.g., one or more elastic strands) to one or more pieces (in this case to the outer cover and body liner, as these terms are used in the publication) to form a composite that functions as an elasticized waist opening. The publication further discloses an adhesive that may be used for this purpose: a hot-melt adhesive designated as H2096 from Ato Findley Adhesives, a business having offices in Milwaukee, Wis.

Similarly, this publication discusses the making of composites that function as elastic waist or crotch openings in a disposable underpant. (See *generally* page 21, line 6, through page 26, line 5.) The adhesive identified above is also given as an example of an adhesive that may be used to make elastic waist or crotch openings.

After exemplary composites such as those referred to above are formed using an adhesive, some or all of the composite may be exposed to ultrasonic energy. Again referring to PCT International Publication Number WO 99/25296, the publication discloses the use of ultrasonic bonding to form side seams or seals in the disposable underpant. (See, e.g., page 29, lines 10-25; additional detail regarding the forming of such side seals is disclosed in U.S. Pat. No. 4,610,681, which issued on Sep. 9, 1986 and is entitled "Disposable Underpants Having Discrete Outer Seals," and which is hereby incorporated by reference in a manner consistent herewith; and U.S. Pat. No. 4,641,381, which issued on Feb. 10, 1997 and is entitled "Disposable Underpants, Such as Infant's Training Pants and the Like," which is also incorporated by reference in a manner consistent with the present application.) Thus, adhesive used to make composites functioning as elasticized waist openings, elasticized leg openings, or both, is exposed to ultrasonic energy when ultrasonic-bonding equipment is used to form the seams or seals in the disposable absorbent article.

The ultrasonic energy may cause the adhesive used to attach elastic materials, such as an elastic strand or ribbon, to a piece, such as a nonwoven web, to flow. The flowing adhesive may then penetrate through the piece to contact the ultrasonic bonding surfaces of ultrasonic bonding equipment. Alternatively, or in addition to, this mechanism, the adhesive may flow through gaps between a laminate structure, if the elastic material is sandwiched between two pieces or is enclosed by a single piece, and build up on the surface of the ultrasonic-bonding equipment. This in turn may lead to build up or accretion of adhesive on parts of the ultrasonic-bonding equipment. As the adhesive builds up, the adhesive may bind other materials such that the build up or accretion comprises both adhesive and other materials, such as fibers from a nonwoven web or other component or piece. This build up or accretion may decrease performance of the ultrasonic-bonding equipment, and may lead to increased down time of the production machine used to make the substrate composite and/or absorbent product.

Figure 1:
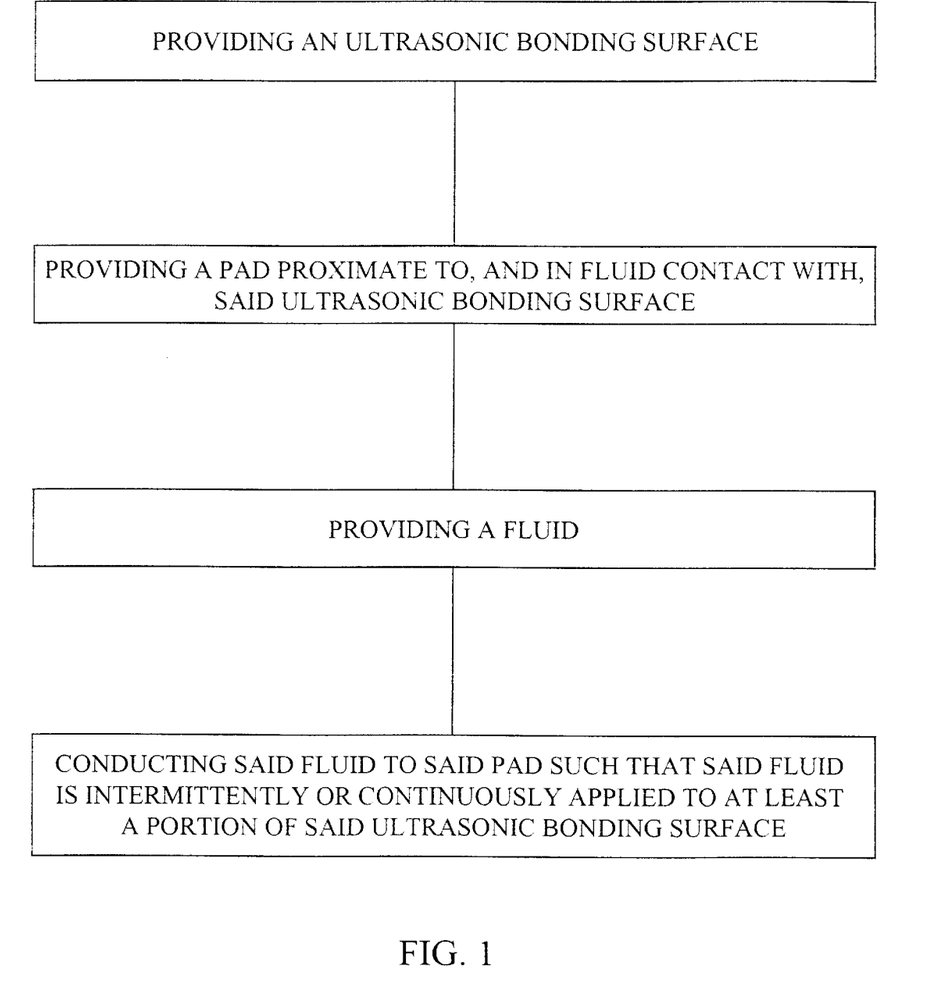
FIG. 1 is a flowchart view of a method for reducing adhesive build-up on ultrasonic bonding surfaces.

To solve this problem we have identified a method for reducing the adhesive build-up or accretion on ultrasonic bonding surfaces by applying a fluid to the ultrasonic bonding surface. Thus, as shown in FIG. 1, one method for reducing adhesive build-up on ultrasonic bonding surfaces involves positioning a pad proximate to, and in fluid contact with, the ultrasonic bonding surface. A fluid is provided and is conducted to the pad such that the fluid is intermittently or continuously applied to at least a portion of the ultrasonic bonding surface.

Figure 2:
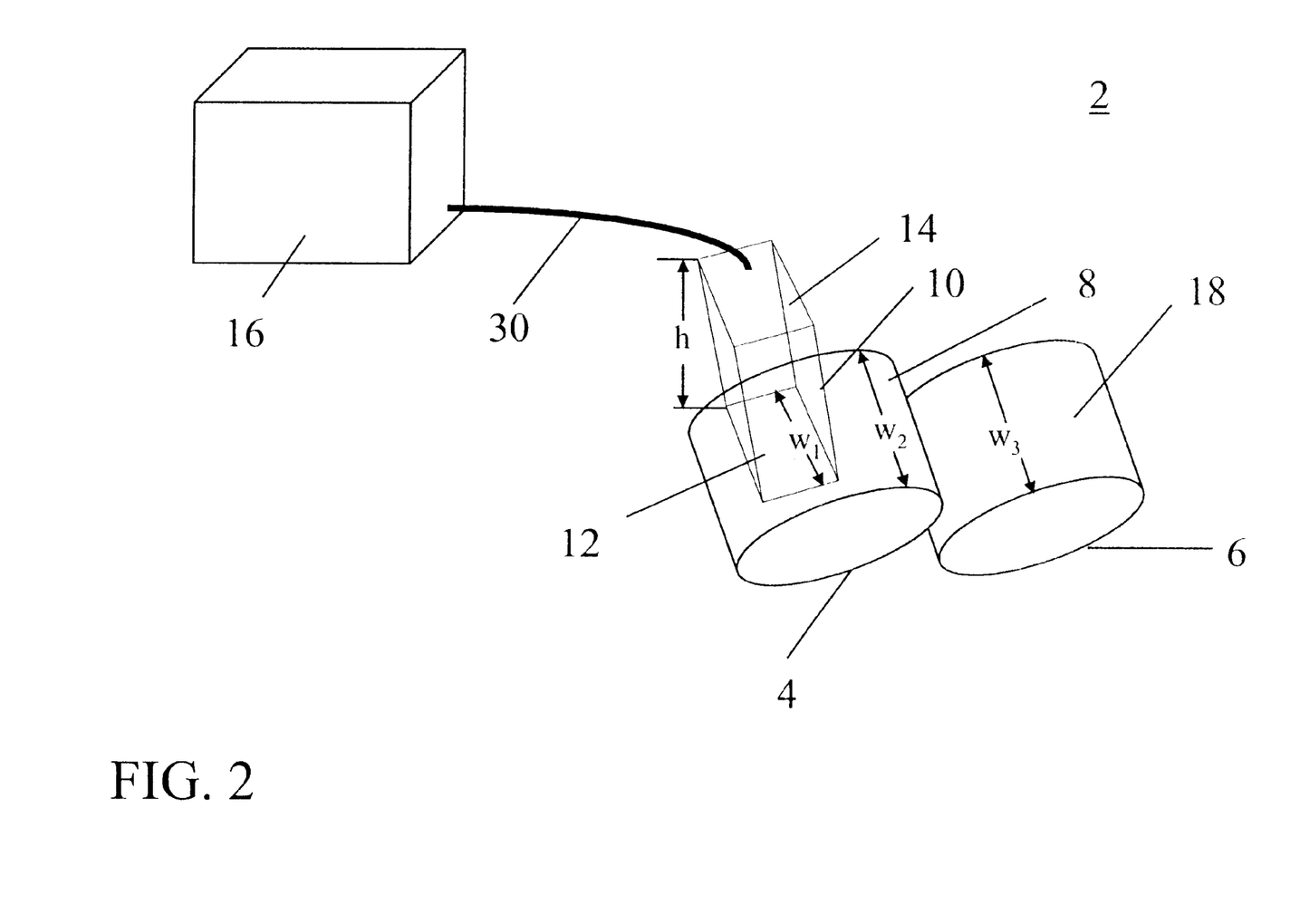
FIG. 2 is a view of an ultrasonic bonding system with a pad mounted proximate to, and in fluid contact with, an ultrasonic bonding system.

Referring to FIG. 2, an ultrasonic bonding system 2 is depicted consisting of an ultrasonic bonding horn 4 and an ultrasonic bonding anvil 6. A pad 10 is provided proximate to, and in fluid contact with, an ultrasonic bonding surface 8 having a width dimension "$w_2$". The pad 10 can be comprised of any material capable of conducting fluid to the ultrasonic bonding surface. Particularly, the pad material can be a sponge material wherein the sponge material is cellulosic material, polyurethane foam material, or natural sponge material. As used herein the term "natural sponge material" refers to materials produced by the animals of the phyla porifera. The pad 10 has a width dimension,"$w_1$", and a height dimension, "h". The pad size can vary depending upon the size of the ultrasonic bonding surface. Typically, the pad has a width dimension, "$w_1$", that is equal to, and suitably less than, the ultrasonic bonding surface width dimension, "$w_2$".

A fluid reservoir 16 having an outlet is provided at a height above the ultrasonic bonding surface 8 that is greater than the height, "h", of the pad 10. The height, "h", of the pad 10 is measured from the point of fluid contact of the lower surface 12 of the pad with the ultrasonic bonding surface 8 to the upper surface 14 of the pad.

A fluid is provided in the fluid reservoir 16. The fluid may be any non-adhesive fluid capable of being conducted to the upper surface 14 of the pad 10 by gravity feed. Particularly, the fluid may comprise water, propylene carbonate, isopropyl alcohol or aqueous solutions thereof, a 0.25 w/w % aqueous solution of an anionic surfactant, mineral oil or some combination thereof. One suitable propylene carbonate material is available under the trade name Jeffersol PC available from Huntsman Petrochemical Corporation, a business having offices in Houston, Tex. One example of a suitable anionic surfactant is polycarboxylated alcohol alkoxylate available under the trade name Poly-Tergent CS-1 from BASF Corporation, a company having offices in Mount Olive, N.J. Suitably, a 4-v/v % aqueous solution of isopropyl alcohol may be applied to the ultrasonic bonding surface.

A conveyance element 30 having one end connected to the outlet of the fluid reservoir 16 and the other end proximate to, or connected with, the upper surface 14 of the pad is provided such that the fluid is conducted from the fluid reservoir via the conveyance element 30 and discharged to the upper surface 14 of the pad. Suitably the conveyance element 30 may be a pipe, tube or other hollow structure capable of conveying fluid from the reservoir 16 to the pad 10. One example of a suitable conveyance element 30 is constructed from a flexible polymer tubing material that is non-reactive with the fluid. Alternatively, the conveyance element 30 may comprise a flexible metal material that is non-reactive with the fluid.

Typically, the fluid is conducted to the upper surface 14 of the pad 10 in a quantity and/or at a rate such that the pad is in a saturated condition. Further, the fluid suitably is conducted to the upper surface 14 of the pad 10 at a rate sufficient to maintain the pad in a saturated condition. The fluid can be intermittently or continuously applied to the ultrasonic bonding surface 8 such that a coating or film is formed on the ultrasonic bonding surface. This coating or film is believed to prevent the adherence of adhesive, alone or in combination with other materials, to the ultrasonic bonding surfaces thus substantially reducing the amount of adhesive build-up on ultrasonic bonding surfaces as compared to ultrasonic bonding surfaces without fluid application. (See discussion below in the Examples section.)

Still referring to FIG. 2, in alternative embodiment (not shown), the pad 10 can be provided proximate to, and in fluid contact with, an ultrasonic bonding surface 18 having a width dimension, "$W_3$". Preferably, the width dimension, "$w_1$", of the pad 10, is equal to, and suitably less than, the width dimension, "$w_3$", of the ultrasonic bonding surface 18.

Figure 3:
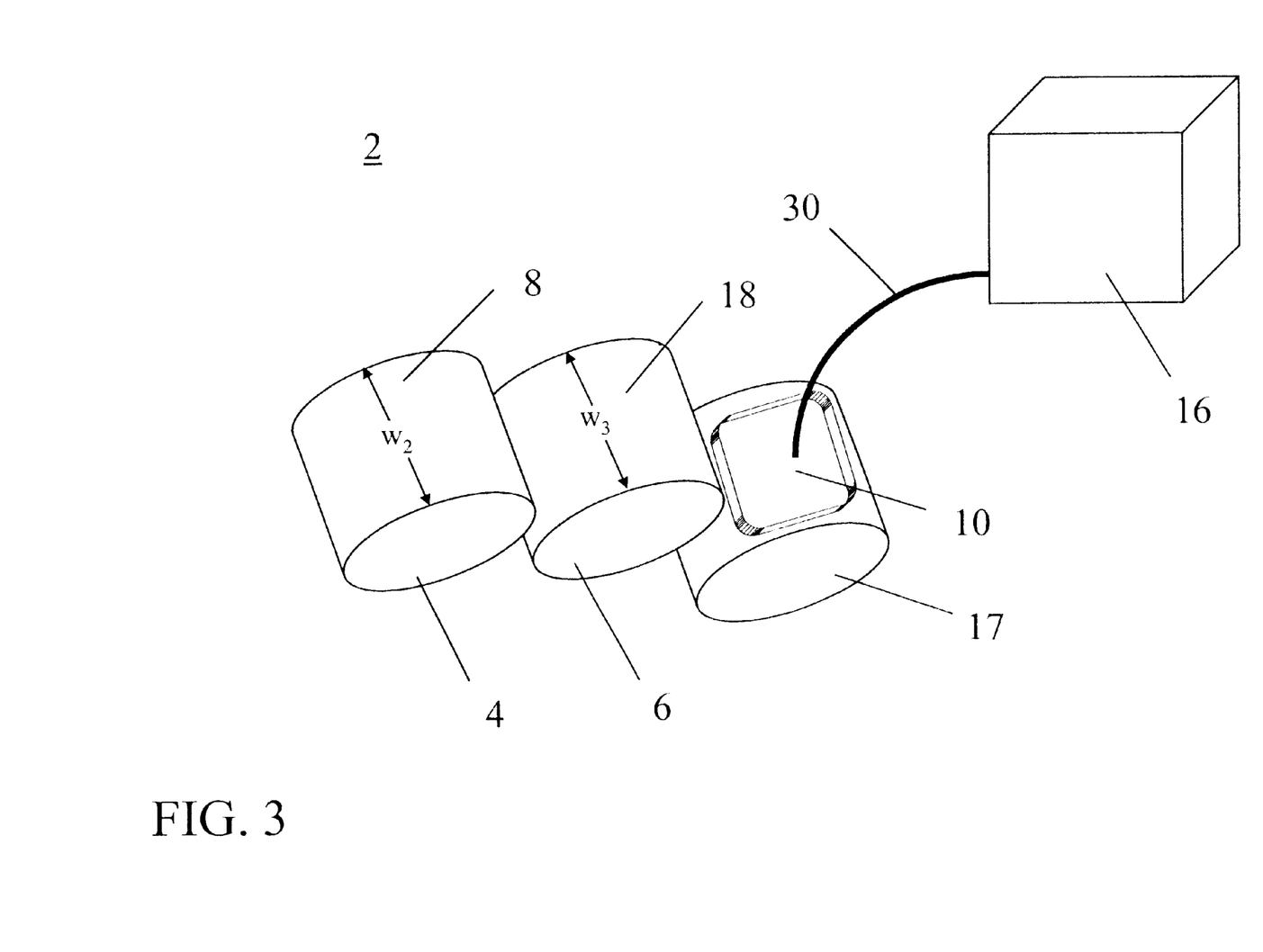
FIG. 3 is a view of an ultrasonic bonding system with a pad mounted on a roller proximate to, and in fluid contact with an ultrasonic bonding surface.

Turning now to FIG. 3, an alternative method for reducing adhesive build-up on ultrasonic bonding surfaces is shown. An ultrasonic bonding system 2 is shown comprising an ultrasonic bonding horn 4 and ultrasonic bonding anvil 6. A pad 10 is provided on a roller 17 proximate to, and in fluid contact with, an ultrasonic bonding surface 18 having a width dimension, "$W_3$". The pad 10 can be of any dimension such that at least a portion of the ultrasonic bonding surface 18 is in fluid contact with the pad 10. Generally, the pad 10 has a dimension such that the pad 10 is in fluid contact with the entire width dimension, "$W_3$", of the ultrasonic bonding surface 18.

Still referring to FIG. 3, in an alternative embodiment (not shown) the pad 10 may be provided on a roller 17 proximate to, and in fluid contact with, ultrasonic bonding surface 8 having a width dimension, "$W_2$". The pad 10 can be of any dimension such that at least a portion of the ultrasonic bonding surface 8 is in fluid contact with the pad 10. Generally, the pad 10 has a dimension such that the pad 10 is in fluid contact with the entire width dimension, "$w_2$", of the ultrasonic bonding surface 8.

A fluid reservoir 16 having an outlet is provided at a height sufficient to allow a fluid to be conducted to pad 10 by gravity feed. The fluid provided in the reservoir may be any non-adhesive fluid capable of being gravity fed. Particularly, the fluid comprises water, propylene carbonate, isopropyl alcohol or aqueous solutions thereof, 0.25 w/w % aqueous solution of an anionic surfactant, mineral oil, or combinations thereof.

A conveyance element 30 having one end attached to the outlet of the fluid reservoir 16 and the other end proximate to, or connected with, the pad 10 such that the fluid conducted from the fluid reservoir 16 via the conveyance element 30 is discharged to the pad 10. Typically, the fluid is conducted to the pad 10 via the conveyance element 30 at any rate sufficient to maintain the pad in a saturated condition. Particularly, the fluid is conducted to the pad 10 at a rate of at least about 3 milliliters per minute such that the fluid is continuously applied to at least a portion of the ultrasonic bonding surface, 8 or 18 respectively.

Figure 4:
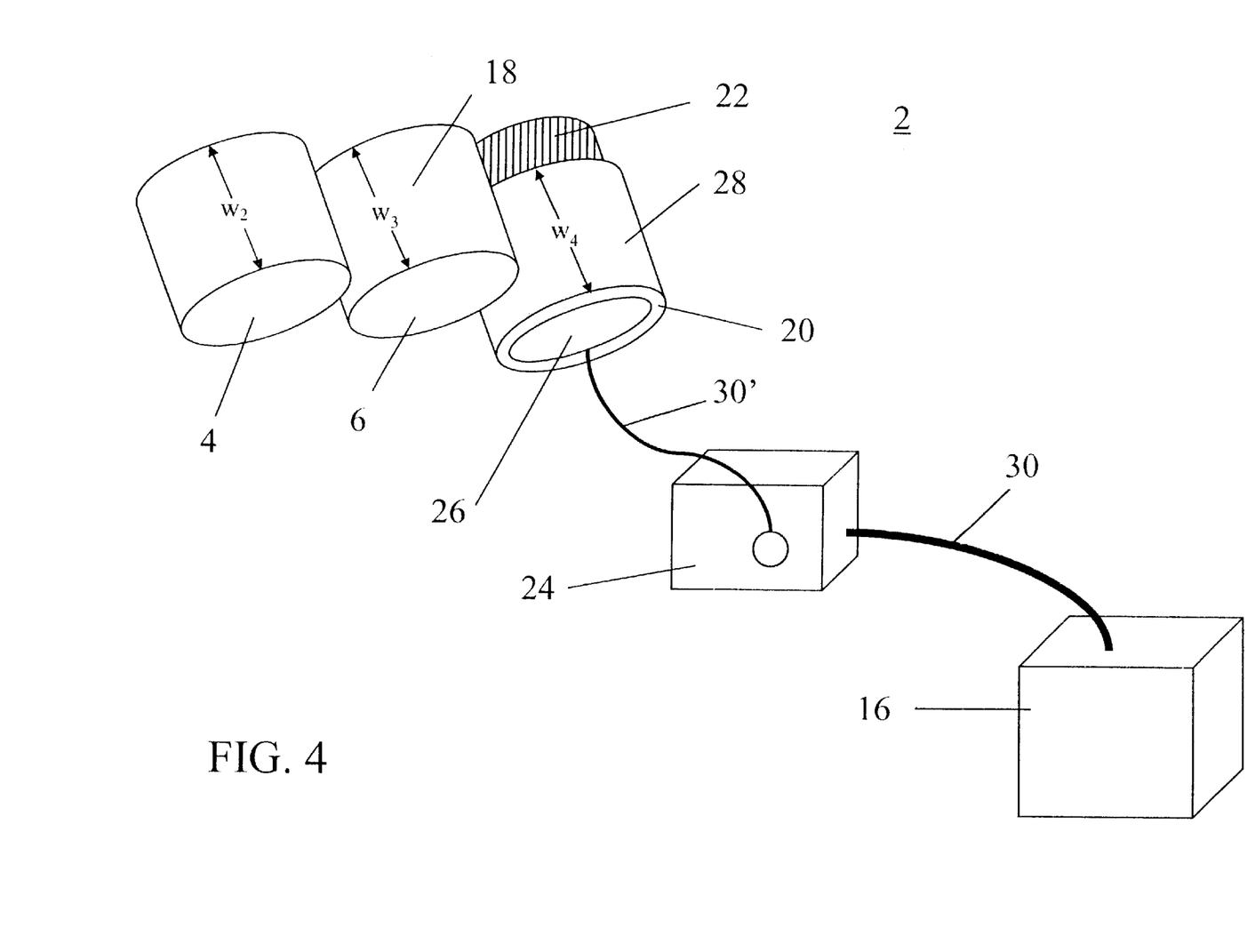
FIG. 4 is a view of an ultrasonic bonding system with a hollow, cylindrical pad provided on a roller mount proximate to, and in fluid contact with, an ultrasonic bonding surface.

Referring to FIG. 4, another method for reducing adhesive build-up on ultrasonic bonding surfaces is shown. An ultrasonic bonding system 2 is depicted comprising an ultrasonic bonding horn 4 having an ultrasonic bonding surface 8 and an ultrasonic bonding anvil 6 having an ultrasonic bonding surface 18. A roller mount 22 is provided proximate to an ultrasonic bonding surface 18. A hollow, cylindrical pad 20 having a width dimension "$w_4$" is provided on the roller mount 22 and in fluid contact with the ultrasonic bonding surface 18. Preferably, the hollow cylindrical pad 20 is comprised of a polyurethane open cell foam material. Generally, the pad 20 can have any width dimension, "$W_4$", such that the pad 20 is in fluid contact with at least a portion of the ultrasonic bonding surface 18. Suitably, the width dimension, "$w_4$" does not exceed the width dimension, "$w_3$". More suitably, the pad 20 has a width dimension, "$W_4$", such that the pad 20 is in fluid contact with the entire width dimension, "$w_3$" of the ultrasonic bonding surface 18.

Still referring to FIG. 4, in an alternative embodiment (not shown) roller mount 22 may be provided proximate to the ultrasonic bonding surface associated with ultrasonic bonding horn 4 (analogus to bonding surface 8 in FIG. 3). The pad 20 is provided on roller mount 22 in fluid contact with said ultrasonic bonding surface depicted in FIG. 4. Suitably, the width dimension, "$w_4$" of the pad 20 does not exceed the width dimension, "$w_2$" of ultrasonic bonding horn 4. More suitably, the pad 20 has a width dimension, "$W_4$", such that the pad 20 is in fluid contact with the entire width dimension, "$w_2$" of the ultrasonic bonding horn 4.

A fluid reservoir 16 having an outlet and containing a fluid, preferably mineral oil, is provided. At least one conveyance element 30 having an end connected to the outlet of the fluid reservoir 16 is provided for conducting a fluid contained in the reservoir 16 to the pad 20. Optionally, a conduction element 24 capable of providing a motive force for conveying the fluid from the fluid reservoir 16 via the conveyance element 30 to the pad may be provided. One suitable conduction element is a pump having a fluid inlet, a fluid outlet and mechanism for delivering the fluid at a selected volumetric flow rate or mass flow rate. The conduction element 24 is interposed between the fluid reservoir 16 and the pad 20 such that conveyance element 30 has one end attached to the outlet of the reservoir 16 and the other end attached to a fluid inlet of the conduction element 24. A second conveyance element 30' is provided having one end attached to a fluid outlet of the conduction element 24 and the other end proximate to, or connected with the interior surface 26 of the pad 20. Suitably, the fluid is delivered from the fluid reservoir 16 to the conduction element 24 via the conveyance element 30 and from the conduction element 24 to the pad 20 via conveyance element 30' a rate of at least about 3 milliliters per minute. The fluid is conducted through the polyurethane, open-cell foam material to the exterior surface 28 of the hollow, cylindrical pad 20 such that the fluid is continuously applied to at least a portion of the ultrasonic bonding surface 18.

While the invention has been described in conjunction with three specific embodiments, it is to be understood that many alternatives, modifications, and variations will be apparent to those skilled in the art in light of the foregoing description. Accordingly, this invention is intended to embrace all such alternatives, modifications, and variations that fall within the spirit and the scope of the appended claims.

Tests

Accretion Value

The accretion or build-up of adhesive, alone or in combination with other materials—e.g., fibers, was measured by running a laminate of the adhesive and the spunbond layers through a rotary ultrasonic bonder at 300 feet per minute for ten minutes. The rotary bonder included a horn and a dot pattern anvil design. The ultrasonic generator was a 3005 Autotrac, 20 KHz, 3000-watt generator from Dukane Corporation, a business having offices in Saint Charles, Ill. A variable-power supply was used to vary power available to the generator. The power level used was 100% which corresponds to an ultrasonic wave amplitude of 2.8 to 3.5 mil (1 mil is equivalent to 1/1000 inch). The horn diameter was approximately 6.75 inches, with the pressure exerted by the horn on the anvil typically about 40 pounds per square inch or more to ensure good contact between the substrate, web, or laminate being processed; the horn; and the anvil.

A cellulose sponge was clamped in place, above and proximate to the ultrasonic bonding horn. The lower surface of the sponge was placed in fluid contact with the ultrasonic bonding surface of the ultrasonic bonding horn. (See FIG. 5.) The sponge was saturated with a test fluid. The test fluid was conducted to the top surface of the sponge at a rate of 3 milliliters per minute using a VWR Brand variable-flow mini-pump available from VWR Scientific Products, a business having offices in West Chester, Pa. The fluid was allowed to wick down the sponge and was applied to the ultrasonic bonding surface.

The anvil had a dot pattern, with each pin having a 45 mil diameter and a height of 31 mil. The spacing between each pin was about 79 mil. The anvil pins were made from D2 tool steel, which was heat treated and through hardened to Rockwell C 60-63. The width of the pattern was 300 mil. The diameter of the anvil was about 5.7 inches. Additional detail on related designs and specifications pertaining to ultrasonic equipment is found in U.S. Pat. Nos. 5,110,403 and 5,096,532, both of which are incorporated by reference in a manner consistent with the present application.

Both the anvil and the horn were cleaned prior to each test. The horn was wiped with d-limonene to ensure that no adhesive was left on the surface. Any gross build-up on the anvil pins was removed using a tweezers. The anvil was then removed from the rotary bonding equipment and placed in an ultrasonic plunge bonder. A thick layer of spunbond material was placed over the anvil pins and ultrasonic energy was applied for about 0.5 to 1 second. After bonding, the spunbond material was removed along with the adhesive build-up. The process was repeated until the build-up was completely removed.

After each test run, the build-up, which consisted of adhesive and nonwoven fiber, was scraped from the horn and the anvil and weighed, giving the accretion value for the evaluated adhesive.

The laminates were prepared on equipment available from Nordson Corporation, having business offices in Atlanta, Ga. Two nonwoven webs comprising spunbond polypropylene at a basis weight of 0.55 ounce per square yard were directed to a nip between two rolls, a rubber roll having a 4-inch diameter, and a steel roll having a 6-inch diameter. Typically, the equipment was operated at a speed of 100 feet per minute.

The adhesives were applied using a meltblowing technique at a rate of 10 grams per square meter. The adhesives used to prepare the laminates were from Ato Findley, having business offices located in Wauwatosa, Wis. The tested adhesives includes those have the alphanumeric designators H2525A and H2096. The adhesive melt tank temperature was set at 330° F. for the H2525A adhesive and 370° C. for the H2096 adhesive. The air temperature was set at 50 degrees higher than the adhesive melt tank temperature. The air pressure was 18 psi.

The applicator used to deposit the adhesive was positioned so that the face of the outlet—which was roughly parallel to the surface of the web to which the adhesive was first applied—was 3 inches from the surface of the web. Furthermore, the central axis of the outlet, which is perpendicular to the web to which the adhesive is first applied, was 8 inches from a parallel axis that passes through the nip defined by the rubber and steel rolls. The gauge pressure was set at 40 psi. The adhesive was applied to one nonwoven web. The other nonwoven web was brought into contact with the adhesive and the underlying web at the nip.

EXAMPLES

Example 1

Laminates were made using the procedure outlined above. The laminates were run through the ultrasonic bonding equipment with the sponge in place and the fluid pump set to deliver the fluid to the sponge at a rate of 3 milliliters per minute. The tested fluids include an 0.25 w/w % aqueous surfactant solution prepared using Poly-Tergent CS-1, an anionic, polycarboxylated alcohol alkoxylate surfactant available from BASF Corporation, a business having offices in Mount Olive, N.J.; a 4 w/w % aqueous alcohol solution prepared using isopropyl alcohol from Fischer Scientific, a business having offices in Pittsburgh, Pa.; JEFFERSOL PC, propylene carbonate available from Huntsman Corporation, a business having offices in Salt Lake City, Utah; and mineral oil commercially available as Johnson & Johnson Baby Oil from Johnson & Johnson, business having offices located in New Brunswick, N.J.

Figure 5:
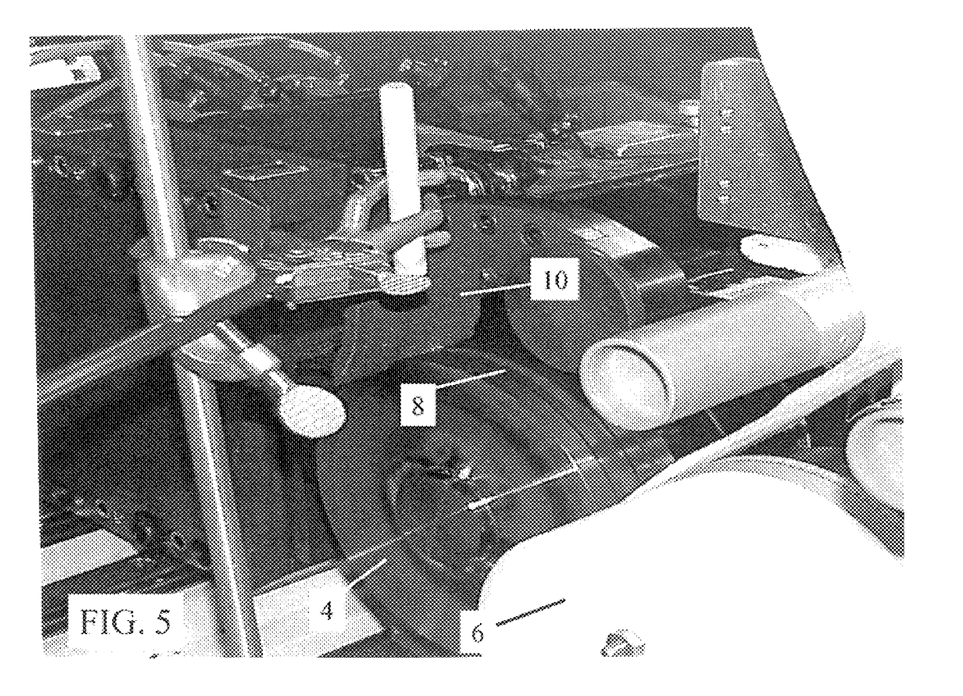
FIG. 5 is a photographic view of an ultrasonic bonding system operating with a fluid applied to the ultrasonic bonding surface of an ultrasonic horn.

As shown in FIG. 5, no measurable build-up was detected on the horn or the anvil after a 10 minute run for each of the four tested fluids.

Example 2

Laminates were made using the procedure outlined above. The laminates were run through the ultrasonic bonding equipment without a sponge in place and the fluid pump turned off. At the end of the run, the build-up was scraped off the horn and the anvil and weighed to determine the accretion value.

| Adhesive | Run Time | Accretion Value (g) |
|----------|----------|---------------------|
| H2525A   | 6 min.   | 1.203               |
| H2096    | 5 min.   | 0.288               |

Figure 6:
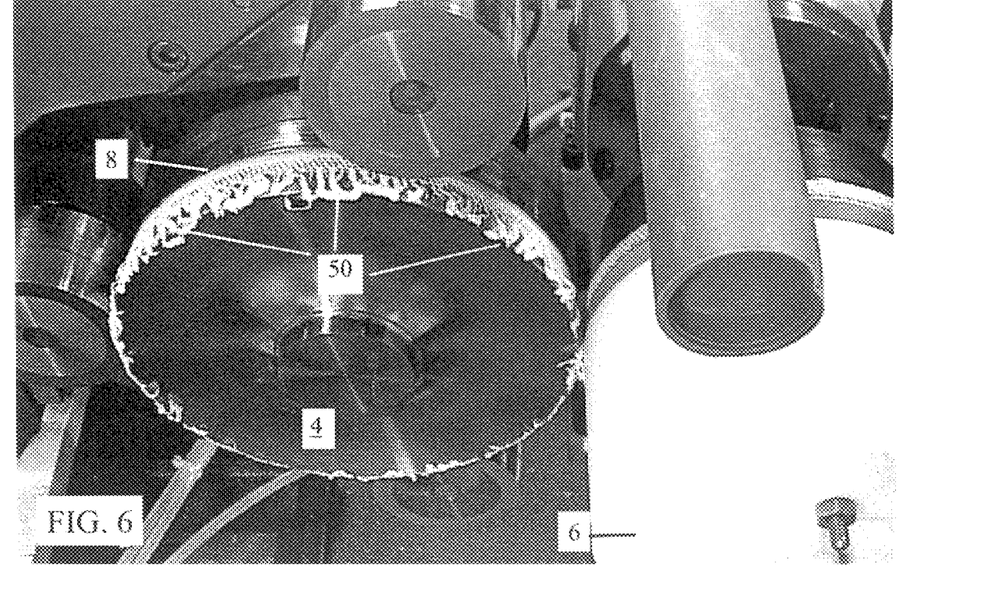
FIG. 6 is a photographic view of an ultrasonic bonding system operating without a fluid applied to the ultrasonic bonding surface.

As can be seen from the preceding table, the current method of ultrasonic bonding of spunbond laminates results in appreciable build-up on the ultrasonic bonding surfaces. This build-up 50 occurred on the ultrasonic bonding surface 8 of the ultrasonic bonding horn 4 as depicted in FIG. 6. However, as demonstrated in Example 1, when a fluid is applied to the ultrasonic bonding surfaces the amount of build-up is greatly reduced.

We claim:

1. A method for reducing adhesive build-up on ultrasonic bonding surfaces, the method comprising:
    providing an ultrasonic bonding surface having a width dimension;
    providing a pad proximate to, and in fluid contact with, the ultrasonic bonding surface;
    providing a fluid; and
    conducting the fluid to the pad so that the fluid is intermittently or continuously applied to at least a portion of the ultrasonic bonding surfaces.
    wherein the pad comprises cellulosic material, polyurethane foam material, or natural-sponge material.

2. The method of claim 1 wherein the ultrasonic bonding surface is the ultrasonic bonding surface of an ultrasonic bonding horn.

3. The method of claim 1 wherein the ultrasonic bonding surface is the ultrasonic bonding surface of an ultrasonic bonding anvil.

4. The method of claim 1 wherein the pad has a width dimension equal to the width dimension of the ultrasonic bonding surface.

5. The method of claim 1 wherein the pad is provided in a position above, and proximate to, the ultrasonic bonding surface such that a lower surface of the pad is in fluid contact with the ultrasonic bonding surface.

6. The method of claim 1 wherein the pad is positioned on a roller proximate to, and in fluid contact with, the ultrasonic bonding surface.

7. The method of claim 1 wherein the fluid is conducted to the pad in a quantity sufficient to place the pad in a saturated condition.

8. The method of claim 7 wherein the fluid is conducted to the pad at a rate sufficient to maintain the pad in a saturated condition.

9. A method for reducing adhesive build-up on ultrasonic bonding surfaces, the method comprising:
    providing an ultrasonic bonding surface;
    providing a pad on a roller proximate to, and in fluid contact with, the ultrasonic bonding surface;
    providing a fluid reservoir;
    providing a fluid in the fluid reservoir;
    providing a pump to conduct the fluid from the fluid reservoir to the pad; and
    conducting the fluid from the reservoir to the pad and so that the fluid is continuously applied to at least a portion of the ultrasonic bonding surface.

10. The method of claim 9 wherein the pad is on a roller proximate to, and in fluid contact with the ultrasonic bonding surface of an ultrasonic bonding horn.

11. The method of claim 9 wherein the pad is on a roller proximate to, and in fluid contact with the ultrasonic bonding surface of an ultrasonic bonding anvil.

12. The method of claim 9 wherein the fluid is conducted to substantially all of the ultrasonic bonding surface.

13. The method of claim 9 further comprising selecting the fluid from the group consisting of water, propylene carbonate, isopropyl alcohol or aqueous solution thereof, mineral oil, 0.25-w/w % aqueous solution of an anionic surfactant, and combinations thereof.

14. The method of claim 9 wherein the pad comprises a polyurethane open cell foam material.

15. The method of claim 9 wherein the fluid is conducted from the reservoir to the pad at a rate of at least about 3 milliliters per minute.

16. The method of claim 9 wherein the fluid reservoir is positioned at a height sufficient to allow the fluid to be conducted by gravity to the pad.

17. A method for reducing adhesive build-up on ultrasonic bonding surfaces, the method comprising:
    providing an ultrasonic bonding surface;
    providing a hollow, cylindrical polyurethane open cell foam pad having an interior surface and an exterior surface;
    providing a roller mount proximate to the ultrasonic bonding surface;
    providing the pad on the roller mount such that the exterior surface is proximate to, and in fluid contact with, the ultrasonic bonding surface;
    providing a fluid reservoir;
    providing mineral oil;
    providing a pump;
    delivering the mineral oil to the interior surface of the pad via the pump at a rate of at least about 3 milliliters per minute; and
    conducting the mineral oil to the exterior surface of the pad such that the mineral oil is continuously applied to substantially all of the ultrasonic bonding surface.

* * * * *